No. 783,655. PATENTED FEB. 28, 1905.
R. VOLTZ & O. OHMING.
LOOSE OR IDLE PULLEY.
APPLICATION FILED SEPT. 9, 1904.

Witnesses.
Ernest Pulsford.
S. H. Finning.

Inventors
Richard Voltz,
Otto Ohming
By their Attorneys
Baldwin & Wight.

No. 783,655. Patented February 28, 1905.

UNITED STATES PATENT OFFICE.

RICHARD VOLTZ AND OTTO OHMING, OF MICHIGAN CITY, INDIANA.

LOOSE OR IDLE PULLEY.

SPECIFICATION forming part of Letters Patent No. 783,655, dated February 28, 1905.

Application filed September 9, 1904. Serial No. 223,897.

*To all whom it may concern:*

Be it known that we, RICHARD VOLTZ and OTTO OHMING, citizens of the United States, residing at Michigan City, in the county of Laporte and State of Indiana, have invented certain new and useful Improvements in Loose or Idle Pulleys, of which the following is a specification.

Our invention relates to belt-pulleys of the class known as "loose" or "idle" pulleys—*i. e.*, those which, while being supported by a shaft, are adapted to revolve without turning the shaft or to remain stationary while the shaft revolves.

The object of our invention is provide a pulley of this class which is simple in construction, self-lubricating, and may be easily supplied with oil or other lubricant, either while carrying a belt or while the belt is applied to and operating a fast pulley—*i. e.*, either while the pulley is rotating or when it is stationary.

In carrying out our invention we form the pulley proper with a rim connected by spokes or a web with a hub surrounding a sleeve that is adapted to be rigidly secured to a shaft. The sleeve is formed with an annular oil-reservoir through which the lubricant passes to the bearing-surfaces between the sleeve and the hub. The reservoir may be filled by means of a radial oil-passage extending from the bore of the hub to the outside of the rim or by means of a lateral passage extending from the reservoir to one end of the sleeve. The sleeve has an annular flange at one end overlapping one end of the hub, and the opposite end of the sleeve is rigidly secured to a collar which has a flange overlapping the opposite end of the hub. In this way the pulley is held against endwise movement on the shaft, while free to revolve about it. Preferably a tongue-and-groove connection is made between the flange and the ends of the hub, thus preventing the escape of oil, and the parts are made adjustable, so that wear may be compensated and a sufficiently close connection maintained.

Figure 1:
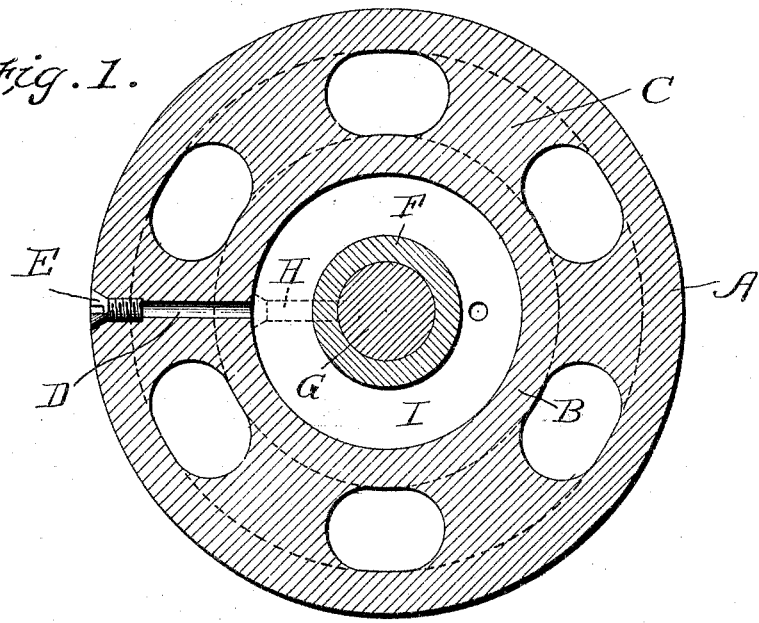
Figure 2:
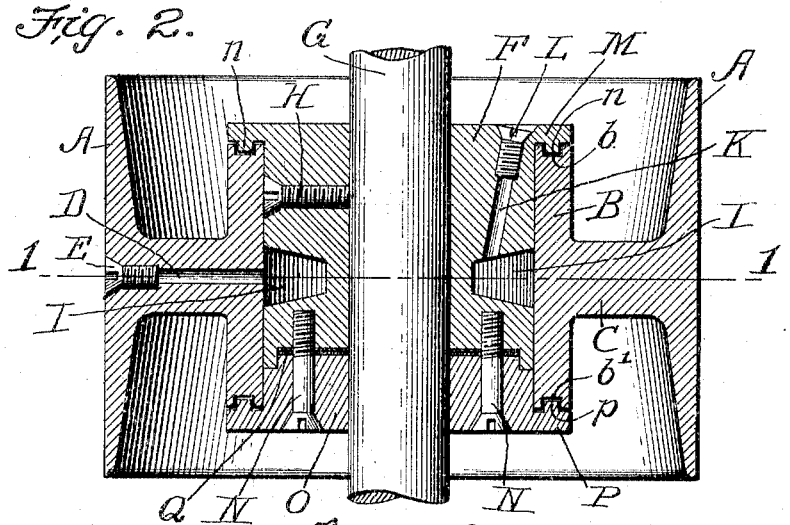
Figure 3:
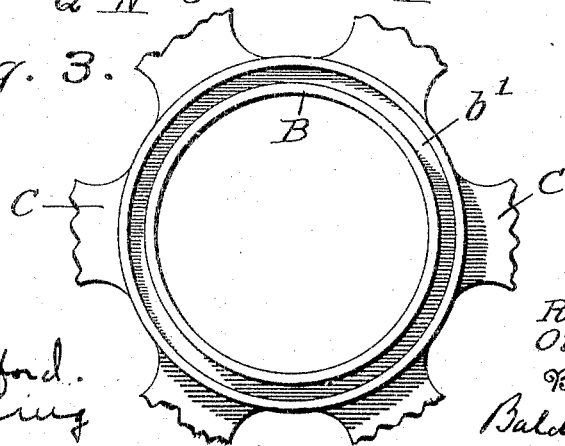

In the accompanying drawings, Figure 1 shows a vertical section of a pulley embodying our improvements on the line 1 1 of Fig. 2. Fig. 2 shows a section taken at right angles to that shown in Fig. 1. Fig. 3 is a detail view, in end elevation, of the pulley-hub.

The rim A of the pulley is connected with the hub B by spokes or by a web C. The hub has a smooth cylindrical bore which is connected with the outside of the rim by a lateral passage D, closed by a removable screw-plug E. The sleeve F is adapted to be secured (in Fig. 2 it is shown as secured) to a shaft G by a screw H. The sleeve is cylindrical and fits the bore of the hub neatly, but permits the pulley to revolve freely around it, and it is formed with an annular oil-reservoir I, which communicates with the passage D, and the sleeve is also formed with a lateral oil-passage K extending from the reservoir to the outer end of the sleeve, being closed by a removable screw-plug L. An annular flange M on the sleeve projects across one end of the hub B and preferably is formed with an annular rib *n* fitting an annular groove *b* in the hub, thus preventing the escape of oil. The opposite end of the sleeve is secured, by means of screws N, to a plug O, which projects part way into the bore of the hub and is formed with an annular flange P projecting across the adjacent end of the hub. Preferably it is formed also with an annular rib *p* fitting an annular groove *b'* in the hub. Washers Q may be interposed between the hub and the sleeve to regulate the distance apart of the flanges M and P and take up wear.

A pulley thus made is very simple in construction and may be produced at small cost. It will be observed that the sleeve is fast on the shaft and the pulley has a bearing of large diameter. The reservoir being in the sleeve it may be replenished while the pulley is rotating, the shaft at this time being stationary. When the shaft is rotating and the pulley is at rest, the reservoir may be filled through the radial passage D. In this way the reservoir may be replenished at any time without in any way altering the condition of the mechanism. The oil or other lubricant finds its way from the reservoir to the bearing-surfaces, but is prevented from escaping by the ribbed flanges at the ends of the sleeve. The pulley may be removed from the shaft without detaching the sleeve by removing the plug O.

We claim as our invention—

1. The combination with a shaft adapted to be rotated, of a belt-pulley adapted to be lubricated either while rotating or at rest and having a radial oil-passage extending to its bore and a sleeve rigidly secured to the shaft about which the pulley revolves and which is formed with an annular oil-reservoir communicating at all times with the radial passage in the pulley and throughout its entire circumference with the pulley-bearing and which is formed also with a lateral oil-supply passage extending from the reservoir to the outer end of the sleeve, means for closing both oil-passages and means for confining the pulley on the sleeve.

2. The combination of a rotary shaft, a loose pulley having a radial oil-passage extending from its periphery to its bore, a sleeve rigidly secured to the shaft and which is formed with an annular oil-passage communicating with said radial passage at all times, a lateral supply-passage extending from the reservoir to one end of the sleeve and a ribbed flange overlapping one end of the pulley-hub, a plug formed with a ribbed flange and secured to the opposite end of the sleeve serving to confine the pulley on the sleeve, spacing-washers between the plug and the sleeve, and means for closing the radial and lateral oil-passages.

In testimony whereof we have hereunto subscribed our names.

RICHARD VOLTZ.
OTTO OHMING.

Witnesses:
  W<small>M</small>. O<small>HMING</small>, Jr.,
  G<small>EORGE</small> J<small>OHNSON</small>.